United States Patent
Morone et al.

(10) Patent No.: US 11,698,114 B2
(45) Date of Patent: Jul. 11, 2023

(54) CLUTCH WITH CENTRIFUGAL ASSEMBLY, ESPECIALLY FOR A MOTORCYCLE

(71) Applicant: Endurance Adler S.p.A., Rovereto (IT)

(72) Inventors: Alfio Ersilio Morone, Milan (IT); Federico Maldini, Bologna (IT)

(73) Assignee: Endurance Adler S.p.A., Rovereto (IT)

( * ) Notice: Subject to any disclaimer, the term of this patent is extended or adjusted under 35 U.S.C. 154(b) by 0 days.

(21) Appl. No.: 17/538,681

(22) Filed: Nov. 30, 2021

(65) Prior Publication Data

US 2022/0170519 A1 Jun. 2, 2022

(51) Int. Cl.
 F16D 43/21 (2006.01)
 F16D 13/52 (2006.01)
 F16D 43/22 (2006.01)

(52) U.S. Cl.
 CPC ........... F16D 43/216 (2013.01); F16D 13/52 (2013.01); F16D 43/22 (2013.01)

(58) Field of Classification Search
 CPC ........................... F16D 13/52; F16D 43/02–26
 See application file for complete search history.

(56) References Cited

U.S. PATENT DOCUMENTS

| | | | | |
|---|---|---|---|---|
| 2,564,841 | A * | 8/1951 | Gravina | F16D 43/09 192/12 C |
| 5,284,234 | A * | 2/1994 | Miglizzi | F16D 43/10 192/89.1 |
| 7,428,955 | B2 * | 9/2008 | Shigematsu | F16D 43/12 192/105 C |
| 7,516,825 | B2 * | 4/2009 | Shigematsu | F16D 43/12 192/105 C |
| 2006/0231367 | A1 * | 10/2006 | Shigematsu | F16D 43/12 192/89.22 |
| 2008/0308377 | A1 * | 12/2008 | Shigematsu | F16D 43/12 192/52.4 |
| 2010/0089680 | A1 | 4/2010 | Inomori et al. | |
| 2011/0083934 | A1 * | 4/2011 | Morone | F16D 43/12 192/70.11 |

FOREIGN PATENT DOCUMENTS

| | | |
|---|---|---|
| DE | 1087460 | 8/1960 |
| JP | 2012241804 | 12/2021 |

OTHER PUBLICATIONS

Search Report, Italian Patent Application No. 202000029468, dated Aug. 4, 2021.

\* cited by examiner

*Primary Examiner* — David R Morris
(74) *Attorney, Agent, or Firm* — Greenberg Traurig

(57) ABSTRACT

A clutch having: a fixed hub, a movable hub, and a plurality of plates interposed to selectively transmit a torque. The clutch has a centrifugal pressure plate assembly having: a mass carrier; a plurality of radially movable mass elements, in which each mass element has a pivot connected to the mass carrier for displacement towards an external position under centrifugal effects; wherein the mass elements are further configured to exert axial thrust on a thrust surface of the centrifugal pressure plate assembly, to bring the movable hub closer to the fixed hub and increase the variable axial load. Each mass element has at least one respective rolling element in contact with the thrust surface. The thrust surface has a profile that is sloped and raised towards the external position.

18 Claims, 7 Drawing Sheets

CLUTCH WITH CENTRIFUGAL ASSEMBLY, ESPECIALLY FOR A MOTORCYCLE

RELATED APPLICATIONS

The present application claims priority to Italian Pat. App. No. 102020000029468, filed Dec. 2, 2020 and entitled "Clutch with Centrifugal Assembly, Especially for a Motorcycle", the entire disclosure of which is hereby incorporated herein by reference.

TECHNICAL FIELD

The present disclosure relates to a clutch, in particular a clutch for a motorcycle.

In general, the disclosure concerns a clutch comprising a fixed hub and a movable hub, among which are interposed a plurality of clutch plates which, when pushed axially towards each other, make it possible to transmit a torque. The clutch includes a centrifugal assembly adapted to push axially and bring the fixed hub and the movable hub closer, depending on a clutch rotation speed.

BACKGROUND

The document EP2400177 (A1) to Adler S.p.A. refers to a clutch with an automatic engagement device, and at the same time equipped with a manual operating device. The clutch includes a centrifugal assembly, in which rotatably coupled masses are subjected to displacement under centrifugal effects and cooperate with a pressure ring, to cause axial compression of a plate pack, in order to achieve a clutch engagement condition.

The document GB995989 (A) refers to a clutch activated by a centrifugal mechanism, comprising centrifugal weights that act on a pressure plate.

The document WO2019/101342 (A1) to Adler S.p.A. refers to a clutch with a centrifugal assembly, comprising a plurality of mass elements arranged radially in a mass holder, wherein each mass element comprises a main body and a columnar element connected to a pivot point.

The document EP2175154 (A2) refers to a centrifugal multi-plate friction clutch comprising centrifugal weights being configured to receive a centrifugal force by rotating with the clutch housing and to move in a direction away from the axial center of the clutch shaft; a cam mechanism being configured to convert the centrifugal force into a force in the axial direction by contacting with the centrifugal weights.

The document JP2012241804 (A) refers to a multiple-plate automatic centrifugal clutch device including a centrifugal roller which presses the drive plates and the driven plates to frictionally connect each other by the effect of centrifugal force generated by the rotation of the driven shaft.

The document DE1087460 (B) refers to a centrifugal clutch with rolling elements as centrifugal weights, especially for motor vehicles, in which each centrifugal weight consists of several rotatably interconnected roller-like rolling elements of different diameters and the centrifugal weights are arranged freely movable between two mutually inclined control surfaces.

The prior art solutions allow automatic engagement and disengagement of a centrifugal clutch.

However, centrifugal clutches according to the prior art can be perfected in terms of smoothness of operation, in particular to improve the riding experience on motorcycles.

In particular, the prior art solutions can be perfected in terms of engagement smoothness for a wider range of rotation speeds. Torque transmission in automatic centrifugal clutches, especially for motorcycles, could also be further optimized.

For example, the behavior of a centrifugal clutch during engagement may provide a driving feeling different from the behavior of the same centrifugal clutch during disengagement, thus worsening the user's driving experience. These differences in behavior could even worsen with the progressive wear of the clutch plates.

In general, in known centrifugal clutches there are friction problems and consequent hysteresis of operation involving the centrifugal pressure plate assembly acting on the hubs. Hysteresis problems mean that the torque transmitted by the clutch is not always linear, as it depends on the number of rpm, but also on the driving condition. In particular, at the same speed, a centrifugal clutch may tend to slip during acceleration or throttle opening, and may tend to block in deceleration or when closing the throttle.

SUMMARY

Object of the present disclosure is to solve certain problems of the prior art.

One particular object of the present disclosure is to provide a centrifugal clutch that has well-set operation and provides pleasant use for the user.

A further particular object of the present disclosure is to perfect a centrifugal clutch in terms of the smoothness of engagement and disengagement, preferably for a wider range of rotation speeds.

A further particular object of the present disclosure is to provide a clutch that optimizes torque transmission even during transitions from low rotation speeds to high rotation speeds and during opposite transitions, from high rotation speeds to low rotation speeds.

Yet another particular object of the present disclosure is to mitigate friction problems and consequent operation hysteresis in a centrifugal clutch.

A further particular object is to provide an improved centrifugal clutch, which allows both automatic and manual operation, in particular for effective use on a motorcycle.

Another particular object of the present disclosure is to provide a clutch that provides reliable operation.

A further particular object of the present disclosure is to provide a compact clutch, in particular for effective use on a motorcycle.

A further particular object of the present disclosure is to provide a clutch whose behavior in engine braking situations is improved.

These and other objects are achieved by a clutch and a related transmission system, as set out in the appended claims that form an integral part of this description.

A solution idea behind the present disclosure is to provide for a centrifugal clutch comprising a centrifugal pressure plate assembly, able to control at least partially a variable axial load on the clutch plates.

The centrifugal pressure plate assembly comprises a mass carrier configured to rotate together with the clutch and a plurality of radially movable mass elements in the centrifugal pressure plate assembly, in which each mass element comprises a pivot connected to the mass carrier, being thus configured to be displaced to an external position under centrifugal effects.

With this displacement under centrifugal effects, the mass elements are further configured to exert axial thrust on a thrust surface of the centrifugal pressure plate assembly, to bring the movable hub closer to the fixed hub and increase the variable axial load.

Each mass element comprises at least one respective rolling element in contact with the thrust surface. Advantageously, the presence of the rolling elements makes it possible to reduce the sliding friction between the mass elements and the thrust surface. In this way, the hysteresis effect is advantageously reduced as the engine rpms vary, improving the operation in relation to the transmitted torque and allowing better modulability of the clutch, especially while starting.

The thrust surface comprises a profile that is sloped and raised towards the external position. Preferably, this profile may include curvature. Advantageously, the sloped profile allows the angular speed of rotation of the clutch to be stably correlated with the axial load, allowing better control in transmission of the torque by the clutch, in particular allowing a first engagement of the clutch that is less abrupt while starting.

Overall, the centrifugal clutch of the present disclosure allows a smoother and more pleasant operation for the user.

In particular, the centrifugal clutch of the present disclosure optimizes torque transmission during transitions from low rotation speed to high rotation speeds and during opposite transitions, from high rotation speed to low rotation speed.

Preferably, the centrifugal clutch has a fixed hub that comprises first sliding elements and a movable hub that comprises second sliding elements, configured to engage with each other and to mutually slide when subjected to a torque acting on the clutch, so as to at least partially modify the variable axial load.

In this way, it is advantageously possible to achieve a further closing effect of the plate pack, increasing the torque that can be transmitted by the clutch in conditions of either sudden acceleration or engine braking. Advantageously, the centrifugal clutch according to the disclosure improves the increase of torque transmissible by the clutch under acceleration conditions, while at the same time prevents unwanted loss of engine braking in conditions of braking or deceleration, when the centrifugal pressure plate assembly should tend to open the clutch plates.

In general, the well-set operation of the centrifugal clutch according to the present disclosure is particularly advantageous for applications in motorcycles, especially high-performance motorcycles, allowing an excellent riding experience.

Further features and advantages will be apparent from the detailed description below, of a preferred, non-limiting embodiment of the present disclosure, and the dependent claims that outline preferred and particularly advantageous embodiments of the disclosure.

BRIEF DESCRIPTION OF THE DRAWINGS

The disclosure is illustrated with reference to the following figures, provided by way of not limiting example.

In different figures, similar elements will be indicated using similar reference numbers. In case several elements of the same type are shown in a same figure, only one or only some of them will be explicitly indicated by a respective reference number, whereas the others will be considered included by analogy.

DETAILED DESCRIPTION

Figure 1:
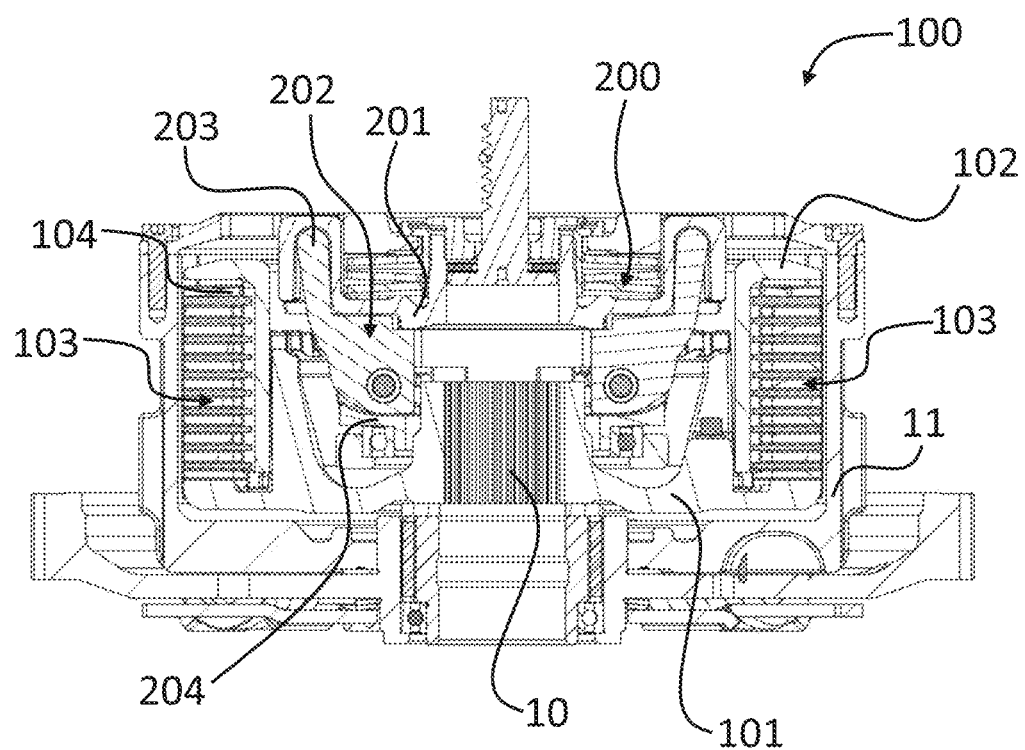
FIG. 1 shows a sectional view of an embodiment of clutch according to the present disclosure.

FIG. 1 shows a sectional view of an embodiment of a clutch 100 according to the present disclosure.

In this embodiment, the clutch 100 is used to control the engagement of a rotary movement between a drive shaft and a primary gear wheel spliced onto a clutch housing of a vehicle, in particular of a motorcycle.

The clutch 100 comprises a fixed hub 101, specifically configured to be coupled with a rotating shaft 10 of the vehicle on which the clutch is installed. The fixed hub 101 is preferably attached to the primary shaft 10 of the gearbox.

The clutch 100 then comprises a movable hub 102, configured to be mounted along an axial direction on the fixed hub 101.

The clutch 100 comprises a plurality of plates 103, which are interposed between the fixed hub 101 and the movable hub 102. In this sense, the clutch 100 is of the "multiple plate clutch" type.

In this embodiment, the plates 103 include a plurality of clutch plates or driving plates, in particular coated plates, which include protruding elements configured to couple with a clutch housing 11, which, in turn, is preferably connected to a vehicle's drive shaft. The plates 103 also include a plurality of driven plates, which include an internal toothing configured to couple with the movable hub 102 and are alternately arranged in relation to the driving plates.

In general, the clutch housing has a housing 11 outside the fixed hub 101 that rotates around a rotation axis. The fixed hub 101 hub is configured to couple with a shaft 10 coaxial with the rotation axis. The movable hub 102 is mounted axially on the fixed hub 101 along the rotation axis.

In addition, preferably, the clutch 100 comprises a judder spring 104 of annular shape, positioned on top of a first one of the plates 103 and proximally to the flange on the movable hub 102. In one variant, the judder spring 104 could be replaced by a double spring system, each having a stroke reduced by half compared to the judder spring 104; in this way it is possible to improve the smoothness of initial engagement of the clutch.

The fixed hub 101 and the movable hub 102 are shaped to rotate together, when axially mounted; thus, the fixed hub 101 and the movable hub 102 are adapted to receiving torque.

In addition, the fixed hub 101 and movable hub 102 are shaped to axially slide respectively, moving away or coming closer in such a way as to reduce or increase the intensity of an axial load on the plates 103.

In this way, the fixed hub 101 and the movable hub 102 exert a variable axial load on the plates 103, so that when the plates 103 are compressed together by the axial load, the clutch 100 allows the torque to be transmitted between the housing and the engine's rotating shaft; on the other hand, when the axial load decreases and the plates 103 are free to slide over one another, since the fixed hub 101 and the movable hub 102 are sufficiently spaced, the clutch is disengaged, substantially without torque being transmitted.

In this way, the clutch 100 is able to selectively transmit torque between two rotating shafts, according to an external control. This external control could be manual, lever or pedal actuated, or of a type implemented by a servo-mechanism.

In addition, the clutch 100 further comprises a centrifugal pressure plate assembly 200 to at least partially control the variable axial load acting on the plates 103.

The centrifugal pressure plate assembly 200 comprises a mass carrier 201 configured to rotate jointly with the clutch 100.

The centrifugal pressure plate assembly 200 further comprises a plurality of mass elements 202 that are radially movable in the centrifugal pressure plate assembly 200. Each mass element 202 comprises a pivot 203 connected to the mass carrier 201, allowing the mass element 202 to be displaced to an external position under centrifugal effects.

By displacement under centrifugal effects, the mass elements 202 are further configured to exert an axial thrust on a thrust surface 204 of the centrifugal pressure plate assembly 200, to bring the movable hub 102 closer to the fixed hub 101 and increase the variable axial load acting on the plates 103.

For this reason, the clutch 100 is defined as a centrifugal type clutch, meaning that it includes an automatic operation due to the centrifugal pressure plate assembly 200 but at the same time allows a manual operation during gear changes.

It should generally be understood that a clutch based on the present disclosure can be either a wet-clutch type or a dry-clutch type.

Figure 2:
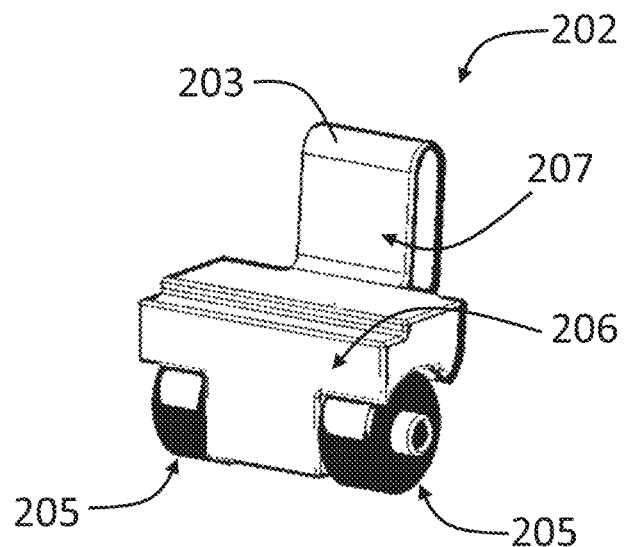
FIG. 2 shows a three-dimensional view of an embodiment of a mass element for a clutch according to the present disclosure.

FIG. 2 shows a three-dimensional view of an embodiment of a mass element 202 of a clutch according to the present disclosure.

Each mass element 202 in the clutch 100 comprises at least one respective rolling element 205, which is configured to make contact with the thrust surface 204.

In this embodiment, there are a pair of roller-type rolling elements 205, pivoted on a respective axis in the mass element 202. Different versions of rolling elements 205 can be provided, for example with additional roller bearings or directly pivoted on the mass element. A version with only one rolling element 205 could also be envisaged.

As it can be seen, the mass element 202 comprises a main body 206 that comprises the rolling element 205, and further comprises a substantially elongated column element 207 that connects the pivot 203 to the main body 206.

The column element 207 is configured to increase a lever arm, which is beneficial for displacement under centrifugal effects of the mass element 202 in the centrifugal pressure plate assembly 200.

Figure 3:
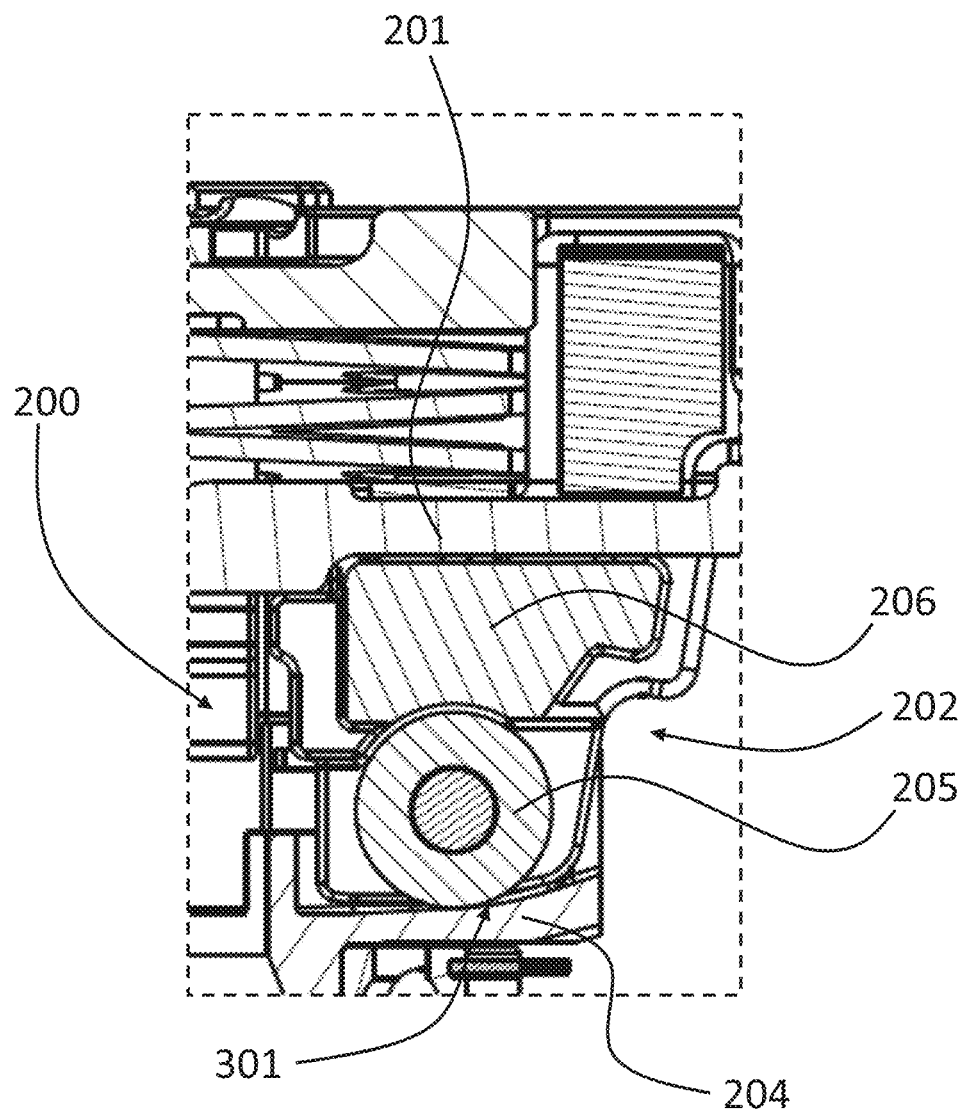
FIG. 3 shows a sectional view of an enlargement of a clutch centrifugal pressure plate assembly according to the present disclosure.

FIG. 3 shows a sectional view of an enlargement of a centrifugal pressure plate assembly 200 according to the present disclosure. In this sectional view, one of the rolling elements 205 is visible, while the pivot 203 is not visible, which is in fact at a different section.

As described, by displacement under centrifugal effects, the mass elements 202 are configured to exert an axial thrust on the thrust surface 204 of the centrifugal pressure plate assembly 200. In this way, using centrifugal effects, it is possible to bring the movable hub 102 closer to the fixed hub 101 and increase the variable axial load acting on the plates 103.

The thrust surface 204 comprises a profile that is sloped and raised towards the outermost position assumed by the mass element 202 in the centrifugal pressure plate assembly 200.

The sloped and raised profile allows to gradually increase the axial load acting on the plates due to the opening of the mass elements 202, acting on the thrust surface through interaction of the rolling elements 205.

In general, the sloped profile of the thrust surface 204 allows to correlate the angular velocity of rotation of the clutch with the axial load, because the centrifugal action on the mass elements 202 depends on the angular velocity, and these elements, opening in the centrifugal pressure plate assembly 200, provide a load that gradually increases and contributes to the closure of the fixed hub 101 and of the movable hub 102 acting on the plates 103.

Preferably, the sloped profile comprises a curvature 301 having an increasing slope towards the outermost position assumed by the mass element 202 in the centrifugal pressure plate assembly 200. In other words, the curvature 301 appears to have a concavity in which the rolling element 205 engages.

This curvature 301 is configured such that, when the mass elements 202 open due to centrifugal effects, the thrust angle of the rolling elements 205 on the thrust surface 204 increases. This helps to improve the graduality with which the axial load acting on the plates 103 is established during the centrifugal opening of the mass elements 202.

The operation and effects of the curvature 301 will be more evident when considering different operating configurations of the centrifugal pressure plate assembly 200, described with reference to the following figures.

Figure 4:
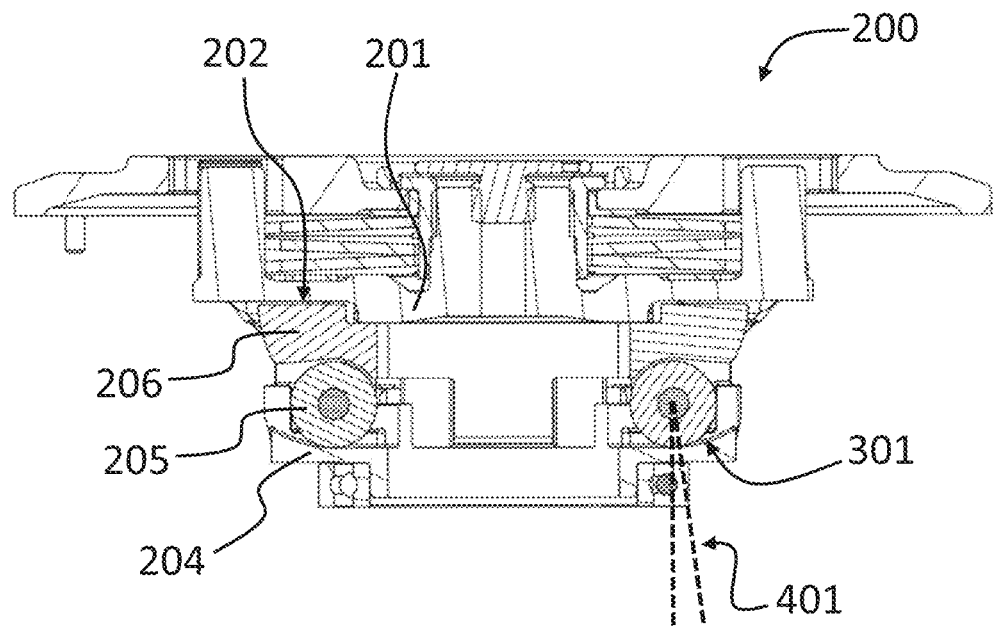
FIG. 4 shows a first section of a centrifugal pressure plate assembly in a first closed configuration.

FIG. 4 shows a first section of the centrifugal pressure plate assembly 200, in which the rolling elements 205 are visible, in a first closed configuration wherein the mass elements are innermost. This first closed configuration corresponds to an operating condition in which the clutch 100 is substantially disengaged, without any axial load acting on the plates 103, in particular for an engine rotating at idle speed.

In the first closed configuration, the curvature 301 defines a first pressure angle 401, defined between an axial direction of the variable axial load acting on the plates 103, and a direction of a load exchanged between the rolling element 205 and the thrust surface 204, normal to the tangent to the latter at the point of contact, which is now substantially internal.

Figure 5:
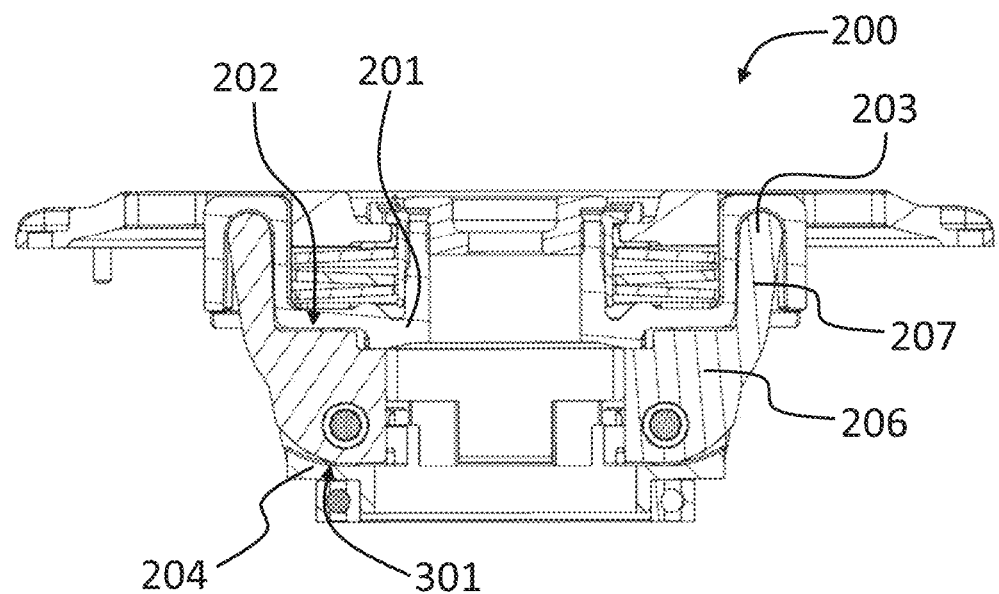
FIG. 5 shows a second section of the centrifugal pressure plate assembly of FIG. 4 in the first closed configuration.

FIG. 5 shows a second section of the centrifugal pressure plate assembly in FIG. 4, in which the main body 206 and the column element 207 of the mass element 202 are visible, still in the first closed configuration.

In this view it can be appreciated that the mass element 202 has a center of mass within the main body 206, and that column element 207 defines a pivot 203 which is radially more external than the center of mass, with respect to the axial direction of the rotation axis on the clutch 100. This helps to increase the centrifugal effects and the thrust provided by the mass elements 202.

Figure 6:
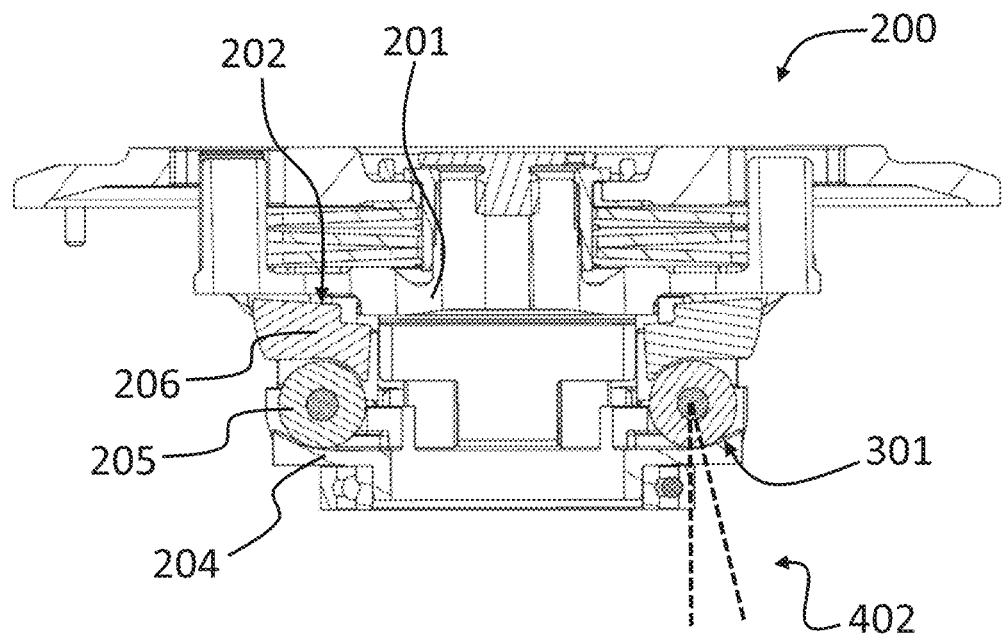
FIG. 6 shows a first section of a centrifugal pressure plate assembly in a second intermediate configuration.

FIG. 6 shows the first section of the centrifugal pressure plate assembly 200 corresponding to FIG. 4, in a second intermediate configuration in which the mass elements have begun their radial displacement. This second intermediate configuration corresponds to an operating condition in which the clutch 100 begins to be engaged, giving rise to an axial load acting on the plates 103 of moderate magnitude, in particular for engine speeds just above idle and up to medium speeds, typically corresponding to a standing start situation.

In the second intermediate configuration, the curvature 301 defines a second pressure angle 402, still defined between an axial direction of the variable axial load acting on the plates 103, and a direction of a load exchanged between the rolling element 205 and the thrust surface 204, normal to the tangent to the latter at the point of contact, now more external.

The second pressure angle 402 in the second intermediate configuration is greater than the first pressure angle 401 in the first closed configuration.

Figure 7:
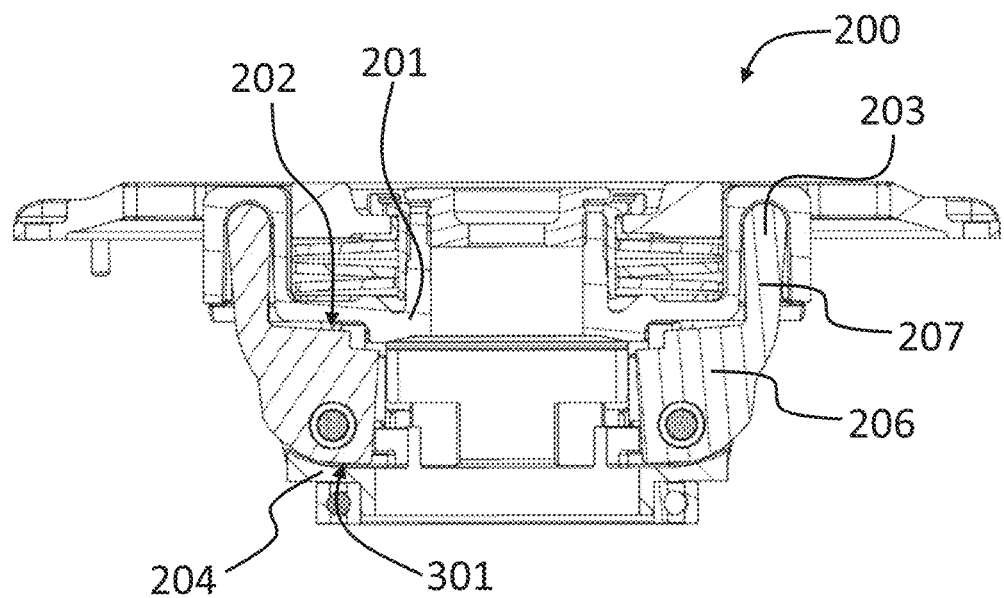
FIG. 7 shows a second section of the centrifugal pressure plate assembly of FIG. 6 in the second intermediate configuration.

FIG. 7 shows the second section corresponding to FIG. 5 of the centrifugal pressure plate assembly 200 in the second intermediate configuration already described.

Figure 8:
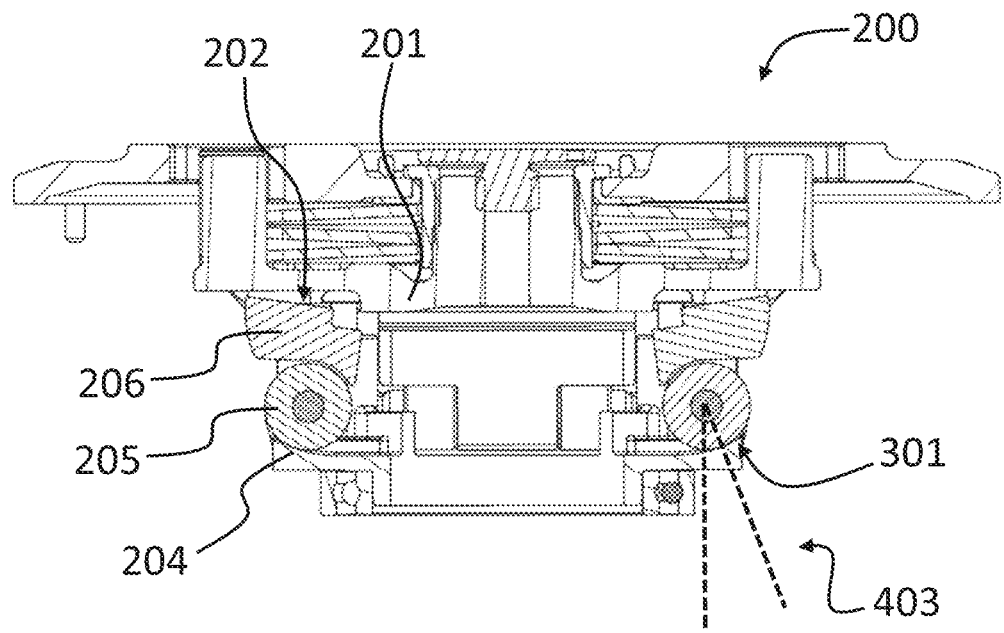
FIG. 8 shows a first section of a centrifugal pressure plate assembly in a third open configuration.

FIG. 8 shows the first section of the centrifugal pressure plate assembly 200 corresponding to FIG. 4 and FIG. 6, in a third open configuration in which the mass elements have fully completed their radial displacement. This third open configuration corresponds to an operating condition in which the clutch 100 is fully engaged, providing an axial load acting on the plates 103 that fully transmits the torque acting on the clutch, in particular for a medium to high engine speed, which typically corresponds to a travelling and/or acceleration situation.

In the third open configuration, the curvature 301 defines a third pressure angle 403, also defined between an axial direction of the variable axial load acting on the plates 103, and a direction of a load exchanged between the rolling element 205 and the thrust surface 204, normal to the tangent to the latter at the point of contact, which is now even further out.

The third pressure angle 403 in the third open configuration is greater than the first pressure angle 401 in the first closed configuration and the second pressure angle 402 in the second intermediate configuration.

Figure 9:
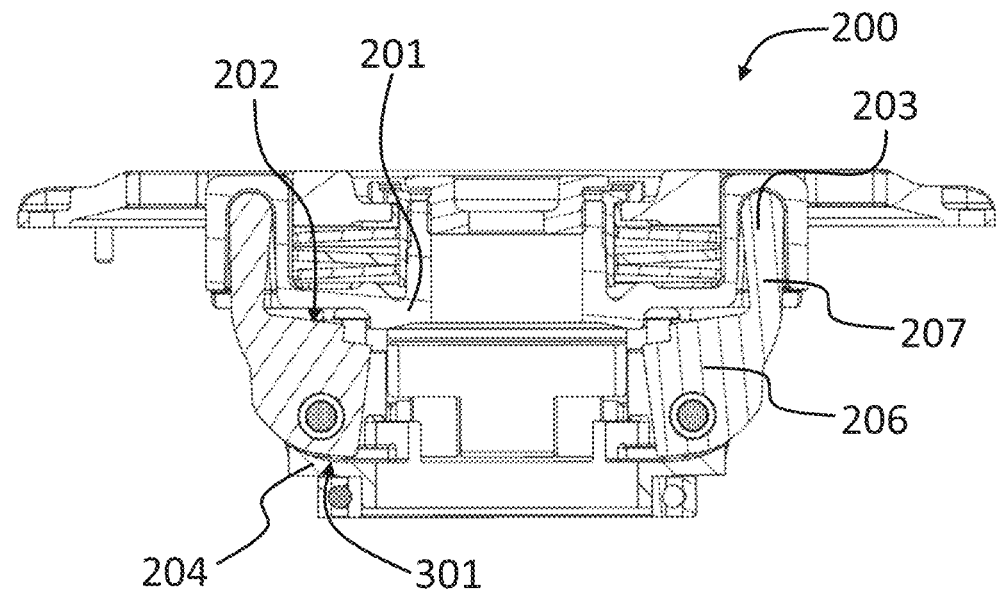
FIG. 9 shows a second section of the centrifugal pressure plate assembly of FIG. 8 in the third open configuration.

FIG. 9 shows the second section corresponding to FIG. 5 and FIG. 7 of the centrifugal pressure plate assembly 200 in the third open configuration above described.

In this third open configuration, the centrifugal pressure plate assembly 200 has substantially completed its centrifugal opening.

In particular, the mass carrier 201 is configured to limit a radial displacement of the mass elements 202, to achieve a maximum open configuration at a predetermined rotation speed of the clutch 100. Specifically, the mass carrier 201 comprises an abutment portion, more external than the mass element, which acts as a limiter of radial displacement for the mass element 202. More specifically, in the preferred embodiment, the abutment portion is configured to stop the radial displacement by interacting with a respective portion of the column element 207 of the mass element 207.

Alternatively, the abutment portion could be configured to interact with a different portion of the mass element, to limit its final position of radial displacement.

By considering the above figures, it can be seen that the curvature 301 defines a plurality of pressure angles, for example 401, 402 and 403, which are generally pressure angles defined between a direction of the variable axial load and a direction of a load exchanged between the rolling element 205 and the thrust surface 204.

These pressure angles 401, 402, and 403 vary, increasing while moving towards the external position. In other words, the curvature 301 has an increasing slope towards the outermost position assumed by the mass element 202 in the centrifugal pressure plate assembly 200, which increases the angle of pressure that affects the axial and radial distribution of the load generated by the mass elements 202.

In general, it can be said that the curvature 301 is therefore configured to provide a stable correlation between a rotation speed of the clutch 100 and the variable axial load acting on the plates 103.

Figure 10:
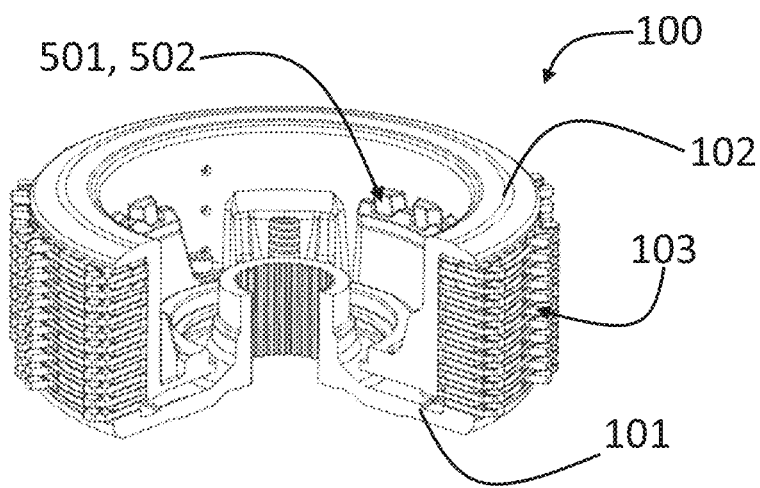
FIG. 10 shows a partial three-dimensional view of a sub-assembly of a clutch hub assembly according to the present disclosure.

FIG. 10 shows a three-dimensional view of the fixed hub 101, movable hub 102, and interposed plates 103, with part of them removed in the figure to allow a view of the inside of the clutch 100.

The fixed hub 101 comprises first sliding elements 501 and the movable hub 102 comprises second sliding elements 502. The first sliding elements 501 and the second sliding elements 502 are configured to engage with each other and to mutually slide when subjected to a torque acting on the clutch 100, in order to at least partially modify the variable axial load acting on the plates 103.

Figure 11:
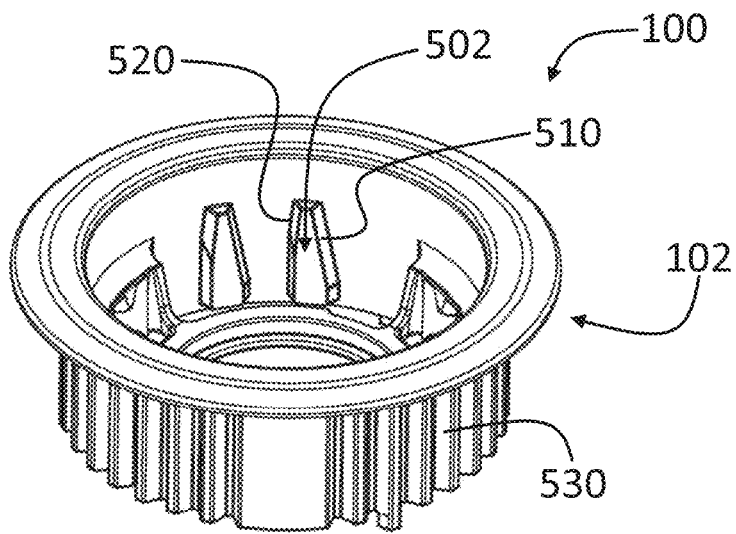
FIG. 11 shows a three-dimensional view of a fixed hub and a movable hub of a clutch according to the present disclosure.
Figure 11:
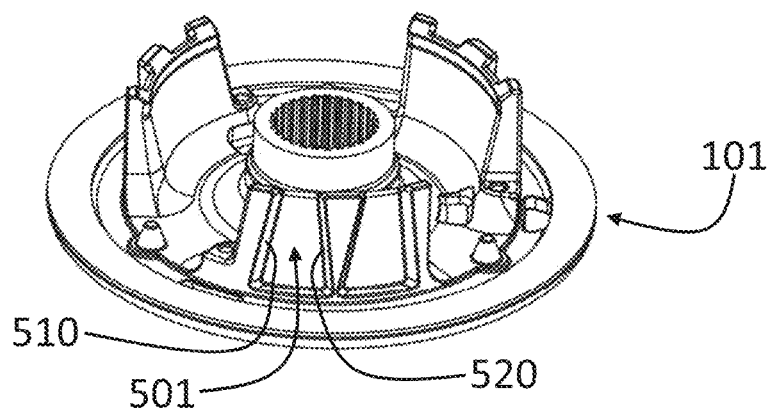

FIG. 11 shows a three-dimensional view of the fixed hub 101 and the movable hub 102 disassembled from each other, to further describe the operation of the first sliding elements 501 and the second sliding elements 502.

The first sliding elements 501 and the second sliding elements 502 include their respective first sliding surfaces 510 for a traction torque, sloped according to a first helix and configured to mate with each other when the fixed hub 101 is subjected to a traction torque, in order to slide the first sliding elements 501 on the second sliding elements 502 respectively and bring the movable hub 102 closer to the fixed hub 101, thereby increasing the variable axial load on the plates 103.

The first sliding elements 501 and the second sliding elements 502 further comprise respective second sliding surfaces 520 for reverse torque, sloped according to a second helix of opposite turn compared to the first helix, and configured to mate with each other when the fixed hub 101 is subjected to reverse torque, that is, opposite to the traction torque, in order to respectively slide the first sliding elements 501 on the second sliding elements 502 to bring the movable hub 102 closer to the fixed hub 101, increasing the variable axial load acting on the plates 103.

It should be noted that, advantageously, the effects of the sliding elements 501 and 502 on the axial load acting on the plates 103 are synergistically combined with the effects of the centrifugal pressure plate assembly 200 described above.

Because the first sloping helix of the first sliding surfaces 510 for traction torque is of opposite turn than the second sloping helix of the second sliding surfaces 520 for reverse torque, the sliding surfaces are sloped at two opposite angles, with respect to the reference axial direction of the axis of the clutch 100.

The movable hub 102 further comprises a crown-like drawing element 530, and the plurality of plates 103 are assembled around the drawing element 530. In particular, the drawing element 530 comprises an external surface shaped in such a way as to couple with an internal toothing on the driven plates, preferably of all the driven plates, among the plurality of plates 103. In particular, the drawing element 530 has a plurality of grooves parallel to each other in the axial direction. Housing all the driven plates on the drawing element 530, gives greater modulability of the clutch 100 and a more effective transmission of torque. In fact, the precaution of housing all the driven plates in the crown drawing element 530 allows operation with sliding surfaces 510 or 520 with higher helix pitches, providing the benefit of better modulability of the clutch 100, during engagement.

Preferably, the second sliding elements 502 of the movable hub 102 are adjacent to an inner surface of the drawing element 503, and preferably the second sliding elements 502 are substantially triangular-shaped or trapezoidal-shaped protrusions.

Advantageously, better lubrication of the elements inside the clutch is achieved, with the benefit of improved cooling and less wear.

The first sliding elements 501 of the fixed hub are recesses with openings at their top, with these openings being configured for the passage of the second sliding elements 502, when the movable hub 102 is assembled on the fixed hub 101; preferably the first sliding elements 501 are substantially triangular-shaped or trapezoidal-shaped recesses.

As described, the first sliding surfaces 510 are sloped according to a first angle with respect to an axial direction of the clutch 100, and the second sliding surfaces 520 are sloped according to a second angle with respect to that axial direction, with the second angle having an opposite inclination than the first angle.

The first sliding surfaces 510 and the second sliding surfaces 520 are thus configured to provide engine braking when the fixed hub 101 is subjected to a reverse torque, which can be generated by a wheel of a vehicle, increasing the axial load acting on the plates 103 to increase an engine braking torque able to be absorbed by a vehicle's engine.

This "engine braking" is a condition in which delaying dragging forces inside an engine are used to slow down a vehicle, rather than using external braking mechanisms such as disc, drum, or similar braking systems. The "engine braking" occurs in particular in petrol engines, especially four-stroke engines, when the throttle is released while leaving gear and clutch engaged.

Advantageously, the second sliding surfaces 520 are configured to generate an axial load under "motoring" conditions, particularly in engine braking conditions, allowing for use of engine braking, especially downhill and for cruising, when high gear ratios are engaged at low engine revolutions.

Thanks to the first sliding surfaces 510, by accelerating i.e., providing traction torque to the clutch, the movable hub 102 and the fixed hub 101 tend to "close" in on one another, increasing the axial load acting on the plate pack 103, which is added to the axial load generated by the centrifugal pressure plate assembly 200 described above.

In this way, a larger torque can be transmitted through the clutch 100 under vehicle acceleration conditions.

Even during release i.e., providing reverse torque to the clutch 100, once again the movable hub 102 and the fixed hub 101 tend to "close" in on one another under engine braking conditions, increasing the axial load acting on the plate pack 103. This time the second sliding surfaces 520 are such that they compensate for the decrease in the axial load acting on the plates 103 when, as the rotation speed decreases, the centrifugal pressure plate assembly 200 described above would tend to close.

In this way, it is advantageously possible to achieve an additional closing effect on the plate pack, under release and engine braking conditions, while maintaining automatic operation of centrifugal clutch disengagement on approaching a stop of the vehicle, with the engine idling and virtually no engine braking.

In one embodiment, the angle between the second sliding surfaces 520 for reverse torque, has an inclination equal to the first angle of the sliding surfaces 510 for traction torque, so that the pitch of the first helix corresponds to the pitch of the second helix. In this embodiment, the same characteristic curve between engine revolutions and maximum transmissible torque occurs both under acceleration conditions (driving torque, i.e., for rising or stable engine revolutions for travelling on a level surface) and in engine braking conditions (reverse torque, i.e., decreasing engine revolutions for travelling on a level surface).

In an alternative preferred embodiment, the second angle, that is the one of the sliding surfaces 520 for reverse torque, has a lower inclination than the first angle, that is the one of the sliding surfaces 510 for traction torque, so that the pitch of the second helix is greater than the pitch of the first helix. In this alternative embodiment, different characteristic curves occur between engine revolutions and maximum transmissible torque: in acceleration conditions there is an effect of the hubs 101 and 102 approaching each other, which is more pronounced than in engine braking conditions, so as to contribute to a less aggressive clutch behavior under low engine rpm and high gears conditions.

Figure 12:
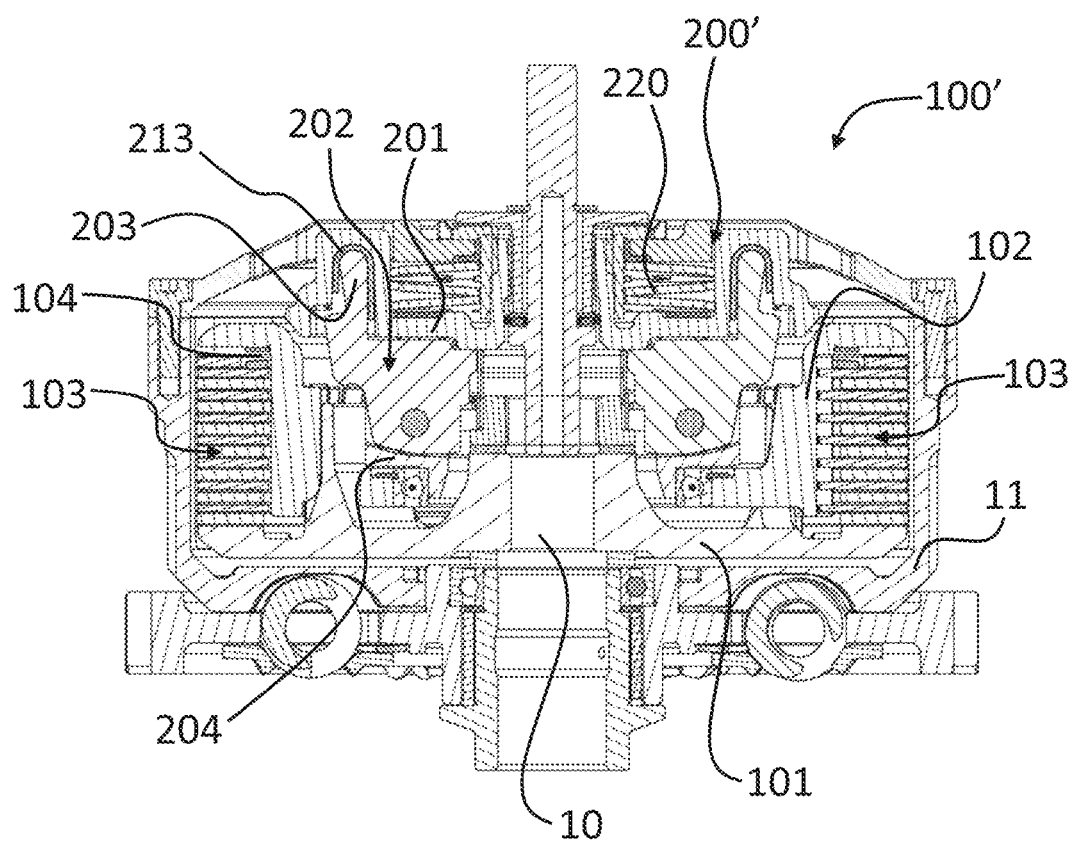
FIG. 12 shows a sectional view of a further embodiment of clutch according to the present disclosure.

FIG. 12 shows a sectional view of an additional embodiment 100' of clutch according to the present disclosure.

The centrifugal pressure plate assembly 200 further comprises a plurality of interface elements 213 between respective pivots 203 and the mass carrier 201.

These interface elements 213 are configured for a friction and/or wear local reduction when the mass elements 202 move by rotating around the pivots 203. This is particularly effective in the case of a mass carrier 201 made of cast aluminum.

The centrifugal pressure plate assembly 200 also comprises at least one over-stroke spring 220, interposed between a cover of the clutch 100' and the mass carrier 201. The at least one over-stroke spring 220 is configured to partially counteract the variable axial load, when reaching a load threshold.

Figure 13:
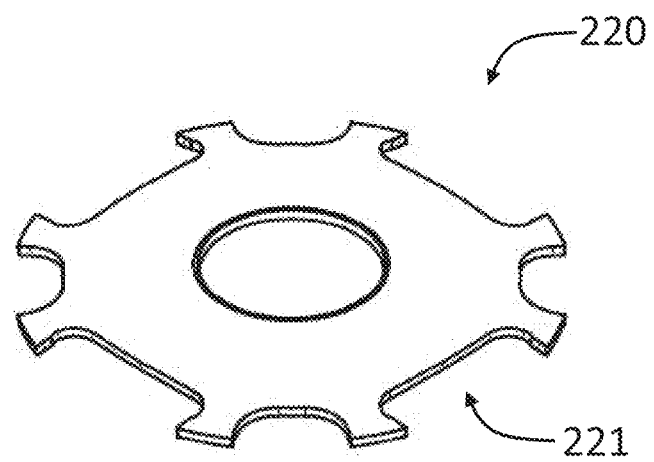
FIG. 13 shows a three-dimensional view of an over-stroke spring embodiment according to the present disclosure.

FIG. 13 shows a three-dimensional view of an embodiment of the over-stroke spring 220, according to the present disclosure.

In this embodiment, the at least one over-stroke spring 220 is of a Belleville type and comprises an external shaping, with cut-outs 221 configured to engage with respective protrusions of the mass carrier 201, at said plurality of mass elements 202.

In one variant, the at least one over-stroke spring could be provided by one or more Smalley wave springs of smaller diameter.

Considering the description given here, the person skilled in the art may design further modifications and variations, in order to meet contingent and specific needs. The embodiments described herein are therefore to be understood as illustrative and non-limiting examples of the disclosure.

What is claimed is:

1. A clutch comprising:
   a fixed hub, a movable hub, a plurality of plates interposed between the fixed hub and the movable hub;

wherein the fixed hub and the movable hub are configured to rotate together and are further configured to axially slide respectively moving away or coming closer, to transmit a variable axial load on the plurality of plates and to selectively transmit a torque acting on the clutch;

the clutch further comprising a centrifugal pressure-plate assembly to at least partially control the variable axial load, the centrifugal pressure-plate assembly comprising:
- a mass carrier configured to rotate together with the clutch;
- a plurality of mass elements radially movable in the centrifugal pressure-plate assembly, wherein each mass element comprises a pivot connected to the mass carrier for a displacement towards an external position under centrifugal effects;
- wherein, with the displacement under centrifugal effects, the plurality of mass elements are further configured to exert an axial thrust on a thrust surface of the centrifugal pressure-plate assembly, in order to bring the movable hub closer to the fixed hub and to increase the variable axial load;
- wherein each mass element comprises at least one respective rolling element contacting with the thrust surface; and
- wherein the thrust surface comprises a sloped profile raised towards the external position.

2. The clutch according to claim 1, wherein the sloped profile comprises a curvature, the curvature having an increasing slope towards the external position.

3. The clutch according to claim 2, wherein the curvature defines a plurality of pressure angles, the pressure angles being defined between a direction of the variable axial load and a direction of an exchanged load between the respective rolling element and the thrust surface, wherein the pressure vary by increasing towards the external position.

4. The clutch according to claim 2, wherein the curvature is configured to provide a stable correlation between a rotation speed of the clutch and the variable axial load.

5. The clutch according to claim 1, wherein the fixed hub comprises first sliding elements and wherein the movable hub comprises second sliding elements, the first sliding elements and the second sliding elements being configured to engage with each other and to mutually slide when subjected to a torque acting on the clutch, so as to at least partially modify the variable axial load.

6. The clutch according to claim 5, wherein the first sliding elements and the second sliding elements comprise first respective sliding surfaces for traction torque sloped according to a first helix and configured to match when the fixed hub is subjected to a traction torque, so as to respectively slide the first sliding elements on the second sliding elements to bring the movable hub closer to the fixed hub, thus increasing the variable axial load on the plurality of plates.

7. The clutch according to claim 6, wherein the first sliding elements and the second sliding elements further comprise second respective sliding surfaces for reverse torque sloped according to a second helix of opposite turn with respect to the first helix and configured to match when the fixed hub is subjected to a reverse torque, the reverse torque being opposite to the traction torque, so as to respectively slide the first sliding elements on the second sliding elements to bring the movable hub closer to the fixed hub, thus increasing the variable axial load on the plurality of plates.

8. The clutch according to claim 7, wherein the movable hub further comprises a crown-like drawing element, the plurality of plates being assembled around the drawing element,
- the drawing element comprising an outer surface shaped so as to couple with an internal toothing of driven plates among the plurality of plates,
- wherein the second sliding elements of the movable hub are adjacent to an internal surface of the drawing element.

9. The clutch according to claim 8, wherein the outer surface is shaped so as to couple with an internal toothing of all driven plates among the plurality of plates.

10. The clutch according to claim 8, wherein the second sliding elements are triangular-shaped or trapezoidal-shaped protrusions.

11. The clutch according to claim 8, wherein the first sliding elements of the fixed hub are recesses having openings on a top thereof, the openings being configured for the passage of the second sliding elements when the movable hub is assembled on the fixed hub.

12. The clutch according to claim 11, wherein the first sliding elements are trapezoidal-shaped recesses.

13. The clutch according to claim 1, wherein the centrifugal pressure-plate assembly further comprises a plurality of interface elements between the respective pivots and the mass carrier, the plurality of interface elements being configured for a friction and/or wear local reduction.

14. The clutch according to claim 1, further comprising a housing external to the fixed hub and rotatable around a rotation axis; wherein the fixed hub is configured to couple with a shaft coaxial to the rotation axis; and wherein the movable hub is axially mounted along the rotation axis on the fixed hub.

15. The clutch according to claim 1, wherein each mass element comprises a main body including the at least one rolling element, and further comprises an elongated column element which connects the pivot with the main body and is configured to increase a lever arm in the displacement under centrifugal effects.

16. The clutch according to claim 15, the mass element having a mass center inside the main body, wherein the column element defines a pivot being radially more external than the mass center with respect to the rotation axis.

17. The clutch according to claim 1, wherein the centrifugal pressure-plate assembly further comprises at least one over-stroke spring interposed between a cover of the clutch and the mass carrier, the at least one over-stroke spring being configured to partially counteract the variable axial load when reaching a threshold.

18. The clutch according to claim 17, wherein the at least one over-stroke spring comprises an external shaping with cut-outs configured to engage with respective protrusions of the mass carrier, at the plurality of mass elements.

* * * * *